Patented July 16, 1929.

1,720,929

UNITED STATES PATENT OFFICE.

HERMANN STAUDINGER, OF FREIBURG, BADEN, GERMANY, AND HERMAN A. BRUSON, OF AKRON, OHIO.

METHOD OF PREPARING HIGHLY-POLYMERIZED PRODUCTS OF UNSATURATED HYDROCARBONS.

No Drawing.   Application filed March 15, 1927. Serial No. 175,632.

Our invention relates to the preparation of polymerization products of unsaturated hydrocarbons.

The object of our invention is to obtain new and useful polymers of certain unsaturated hydrocarbons which are closely related to rubber in their basic molecular structure, such as isoprene, and compounds related to isoprene, such as phenyl butadiene and cyclopentadiene. Another object of our invention is to provide a novel and useful method of obtaining para indene, a compound closely related to cyclopentadiene in structure, but which possesses only one unsaturated bond in the molecule.

Although the chemical structures of cyclopentadiene and butadiene possess certain similarities, they behave entirely differently upon polymerization by heat. Butadiene and the aliphatic butadiene derivatives when heated go over into polymerization products of high molecular weight, such as the so-called "synethic rubbers," whereas cyclopentadiene when heated is converted into dicyclopentadiene, and into a series of polymers, namely, tricyclopentadiene, tetracyclopentadiene, pentacyclopentadiene and polycyclopentadiene (Staudinger and Rheiner, Helv. Chimica Acta 7, 26, 1923; Staudinger and Bruson, Liebig's Annalen der Chemie 447, 97 (1926)). These polymerization products of cyclopentadiene differ from those of the aliphatic butadiene derivatives in that they are crystalline and are formed by a different chemical union of the molecules.

We have made the discovery that cyclopentadiene, isoprene, phenylbutadiene, as well as butadiene derivatives in general, and the like unsaturated hydrocarbons, can be converted by suitable catalysts into new polymers whose degree of saturation is much higher, and whose physical and chemical properties in general are quite different from those of the original hydrocarbon. It is found for instance, that these polymers of cyclopentadiene, phenylbutadiene, isoprene and the like, when freed from solvents, are amorphous powders insoluble in alcohol and are quite different from products obtained by any other known process of polymerization. We have published experimental results in the following articles: (Dissertation of Herman A. Bruson "Über Hochpolymere Verbindungen—Die Polymerization von Cyclopentadiene und Indene" Zurich, Switzerland 1925; H. Bruson and H. Staudinger, Journal of Industrial and Engineering Chemistry 18, 381 (1926); H. Staudinger and H. Bruson, Liebig's Annalen der Chemie 447,110 (1926)).

Such catalysts are the following: The halides of the amphoteric elements, such as the tetra halides of tin and titanium, the tri- and pentahalides of antimony, boron chloride, the halides of arsenic, the halides of ferric iron and of bismuth and also certain strongly negative substances, such as sulphuryl chloride, phosphorus pentoxide, and phosphorus oxychloride. These compounds react with cyclopentadiene with different velocities; the reaction with tin tetrachloride, titanium tetrachloride, antimony pentachloride and boron chloride, for example, being so rapid and evolving so much heat that it is advisable to work in dilute solution of an indifferent solvent and to cool the reaction mixture. Suitable solvents for use with the stannic halides are benzene, chloroform, carbon tetrachloride and the like. The halides of titanium and antimony work best in chloroform or carbon tetrachloride solution. The formation of the polymerization product with the above halides is practically instantaneous. Antimony tribromide, phosphorus oxychloride, and sulphuryl chloride, as well as the halides of ferric iron and of bismuth react more slowly so that when employing them it is unnecessary to employ diluents; and then with proper precautions, the reaction may be carried out at room temperature.

The polymerization product of cyclopentadiene thus obtained is, when pure, a white powder analyzing $(C_5H_6)_x$ and containing one unsaturated bond per $C_5H_6$ group in the molecule. Its molecular weight is high. It is soluble in benzene, chloroform and the like, and may be precipitated from solution with alcohol, acetone or ether. Upon standing in the air it takes up oxygen and becomes insoluble in all known reagents, the final product of autoxidation having the formula $(C_5H_6O)_x$.

A further discovery is that the hydrocarbon indene which is related structurally to cyclopentadiene, but which has a single unsaturated bond, can be converted by means of the above mentioned halides into the already known "para-indene." Para-indene is described in the literature (Weger and Billmann, Ber. 36, 643 (1903) Krämer and Spilker, Ber. 33, 2260 (1900)) and was obtained by treating indene with sulphuric acid or aluminum chloride. Para-indene possesses no reactive unsaturated bonds, and is not appreciably autoxidizable in the air.

However, tin tetrachloride, tin tetrabromide, titanium tetrachloride, antimony pentachloride and boron chloride are more suitable for the purpose of polymerizing indene inasmuch as their solubility in indene, effects a smooth and extremely rapid polymerization which yields a polymer having a higher purity and better quality than that obtained by the known methods employing sulphuric acid or aluminum chloride which are not soluble in indene.

We have also made the discovery that isoprene, phenylbutadiene and the butadiene derivatives in general react with the aforementioned halides to form high molecular weight polymerization products. The reaction product of pure isoprene with tin tetrachloride, forms when precipitated with alcohol, a white powder which is soluble in ether and benezene and which rapidly oxidizes in the air to form a difficultly soluble product. The polymer or phenyl-butadiene obtained by the action of tin tetrachloride is a white powder totally different from any known polymer of this substance.

Mechanism of the reaction.

The mechanism of the reaction which occurs when any suitable unsaturated hydrocarbon is treated with tin tetrachloride or with any one of the aforementioned halides that falls within the general class of halides of amphoteric elements is as follows:

The primary reaction consists of a chemical addition of the halide salt to the unsaturated hydrocarbon by means of secondary valences. This addition compound consists of one or more hydrocarbon groups united to the halide salt by means of secondary valences. When alcohol, acetone, water or other suitable precipitating agent is added, the halide salt splits off, leaving the hydrocarbon component in a polymerized state. This is a new type of chemical reaction involving latent valences.

It is obvious that a great number of unsaturated hydrocarbons of all kinds exist or can be prepared which can theoretically undergo the same general type of reaction and yield hitherto unknown polymerization products. We do not therefore limit this reaction to the unsaturated hydrocarbons here specifically mentioned, but include also all the aliphatic and aromatic unsaturated hydrocarbons, their derivatives and polymers, which possess a chemical structure that is capable of adding halide salts that possess one or more secondary valances, so as to form addition products which are capable of being resolved by means of a suitable reagent, such as alcohol, acetone, or water, into a polymer with simultaneous elimination of the halide component.

Furthermore it is obvious that it is not necessary to use pure hydrocarbons. Crude coal-tar fractions or other distillates in which suitable unsaturated hydrocarbons are present can be employed. For example, the fractions which contain cyclopentadiene and butadiene derivatives, such as occur in the crude benzene fraction of coal tar, can be treated with the aforementioned halides and the polymerization products removed. The indene fractions of the higher boiling light oils may be treated similarly.

The polymers prepared by the processes outlined may be dissolved in a suitable solvent, such as benzene, and used to prepare certain lacquer-like coating materials or varnishes. These coating materials, when spread upon an exposed surface, absorb oxygen from the air and form a hard, glassy finish which is insoluble in any known organic solvent.

Examples of reaction.

I. 100 parts of cyclopentadiene diluted with an indifferent solvent, such for example, as chloroform, is treated in the cold with a solution of 1 part tin tetrachloride dissolved in 10 parts of chloroform. The chemical addition and polymerization is made evident by heat evolution and formation of a deep red color. Upon adding excess alcohol, a white rubbery mass is precipitated, the tin tetrachloride having split off and combined with the alcohol to form a soluble compound which therefore does not contaminate the rubbery substance. This substance is unsaturated to the extent of one-half as much as the original cyclopentadiene. It takes up, for example, one mole of bromine. With hydrogen bromide it forms a deep blue addition product. It is colloidally soluble in benzene and other solvents. Finally it can be vulcanized with sulfur chloride in a manner analogous to rubber.

The above polymerization can also be effected by using boronchloride, titanium tetrachloride, or antimony pentachloride in place of the tin tetrachloride. Ferric chloride and ferric bromide, as well as bismuth trichloride, react more slowly and are best used without solvents, as are also phosphorus oxychloride, phosphorus pentoxide and sulphuryl chloride.

II. 100 parts of indene dissolved in chloroform or other indifferent solvent is treated with a solution of 1 part tin tetrachloride in 5 parts chloroform. The polymerization takes place more slowly than in the case of cyclopentadiene and ordinarily takes fifteen to twenty minutes. The reaction product, para-indene is isolated in the manner described above. The para-indene, is an amorphous, white powder, completely saturated, and forms colloidal solutions.

III. Isoprene dissolved in an equal volume of benzene is treated with an equal weight of tin tetrachloride in the cold. After standing one hour, during which time the temperature rises to 50° C., necessitating the use of a reflux condenser to prevent loss of isoprene, excess alcohol is added. A white rubber-like mass precipitates out. It is soluble in ether, benzene, and chloroform, insoluble in acetone or alcohol. It possesses a high molecular weight and has less unsaturation than isoprene.

IV. Phenylbutadiene, $C_6H_5-CH=CH-CH=CH_2$, is treated with an equal weight of tin tetrachloride dissolved in 10 parts of benzene and the mixture allowed to stand one hour. The polymer in the form of a snow white powder soluble in benzene is precipitated by addition of excess alcohol.

In describing our invention we have given numerous examples of the specific application thereof, but it is obvious that numerous variations may be introduced in the procedures outlined without departing from the spirit of the invention. We desire, therefore, that only such limitations be imposed as indicated by the appended claims.

What we claim is:

1. The method of preparing a polymer of a diolfine hydrocarbon containing four or more carbon atoms to the molecule that comprises treating the hydrocarbon with the solvent and a halide salt of tin.

2. The method of treating a diolfine hydrocarbon or its derivatives having four or more carbon atoms to a molecule which comprises admixing the hydrocarbon with a halide salt of tin to effect an exothermal reaction and a reduction of the unsaturation of the hydrocarbon.

3. The reaction product of a diolfine or derivatives and homologues thereof with a halide salt of tin, said halide having an atomic weight of at least 35.46.

4. The reaction product of an unsaturated diene hydrocarbon having four or more carbon atoms to a molecule and a halide of tin, said reaction product having a higher degree of saturation than the original hydrocarbon.

5. A method of treating an unsaturated hydrocarbon comprising $(C_5H_8)$ groups of $(C_5H_6)$ groups, which comprises intermixing a solution of said hydrocarbon with a halide salt of tin.

6. A method of treating an unsaturated hydrocarbon comprising $(C_5H_8)$ groups or $(C_5H_6)$ groups, which comprises intermixing a solution of said hydrocarbon with a halide salt of tin tetrachloride.

7. A method of treating straight chain diolfines and derivatives thereof which comprises intermixing said materials with a halide salt of tin.

8. A method of treating straight chain diolfines and derivatives thereof which comprises intermixing said materials with tin tetrachloride.

9. A method of treating isoprene and derivatives or homologues thereof which comprises mixing said substances with a halide salt of tin.

10. A method of treating isoprene which comprises mixing said substances with tin tetrachloride.

11. The reaction product of a diene hydrocarbon having five or a multiple of five carbon atoms to a molecule and a halide salt of tin, said reaction product being unsaturated and having the empirical formula $(C_5H_8)_x$ or $(C_5H_6)_x$, where "x" is a whole number greater than 1.

12. A method of treating unsaturated hydrocarbons of a group consisting of isoprene and indene which comprises subjecting them to heat in the presence of tin chloride.

In witness whereof, we have hereunto signed our names.

HERMANN STAUDINGER.
HERMAN A. BRUSON.